US012795591B2

(12) United States Patent
Barbu et al.

(10) Patent No.: US 12,795,591 B2
(45) Date of Patent: Nov. 10, 2026

(54) NOISY POSITIONING DATA PROCESSING

(71) Applicant: Nokia Technologies Oy, Espoo (FI)

(72) Inventors: Oana-Elena Barbu, Aalborg (DK); Dick Carrillo Melgarejo, Lappeenranta (FI); Afef Feki, Sceaux (FR); Muhammad Ikram Ashraf, Espoo (FI)

(73) Assignee: Nokia Technologies Oy, Espoo (FI)

( * ) Notice: Subject to any disclaimer, the term of this patent is extended or adjusted under 35 U.S.C. 154(b) by 274 days.

(21) Appl. No.: 18/788,620

(22) Filed: Jul. 30, 2024

(65) Prior Publication Data

US 2025/0048318 A1 Feb. 6, 2025

Related U.S. Application Data

(60) Provisional application No. 63/517,219, filed on Aug. 2, 2023.

(51) Int. Cl.
*H04W 64/00* (2009.01)

(52) U.S. Cl.
CPC .................................. *H04W 64/00* (2013.01)

(58) Field of Classification Search
CPC ... H04W 64/006; H04W 24/08; H04W 24/10; H04W 64/00; H04W 24/02; G01S 5/0009; G01S 5/0018; G01S 5/011; G01S 5/018; G01S 5/0236; G01S 5/0269; G06F 18/10; G06N 20/00
See application file for complete search history.

(56) References Cited

U.S. PATENT DOCUMENTS

2021/0109188 A1* 4/2021 Kumar .................. G01S 1/0428
2023/0043111 A1* 2/2023 Zhuang ................... G01S 5/021
2025/0081154 A1* 3/2025 Hirzallah ............. G01S 5/0036

FOREIGN PATENT DOCUMENTS

WO WO-2021071581 A1 * 4/2021 .......... H04W 64/006
WO WO-2024211102 A1 * 10/2024 ............ H04W 64/00
WO WO-2025234481 A1 * 11/2025 ............. G06N 20/00

* cited by examiner

*Primary Examiner* — Matthew C Sams
(74) *Attorney, Agent, or Firm* — Barta Jones, PLLC

(57) ABSTRACT

Example embodiments of the present disclosure relate to methods, devices, apparatuses and computer readable storage medium of noisy positioning data processing. In a method, a first apparatus obtains measurement data and first positioning data associated with the measurement data. The first apparatus generates second positioning data from the first positioning data based on network assistance information. The first apparatus transmits at least the measurement data and the second positioning data. In this way, an accuracy of the positioning data can be improved.

20 Claims, 7 Drawing Sheets

NOISY POSITIONING DATA PROCESSING

FIELDS

Various example embodiments of the present disclosure generally relate to the field of telecommunication and in particular, to methods, devices, apparatuses and computer readable storage medium of noisy positioning data processing.

BACKGROUND

In the telecommunication industry, Artificial Intelligence/Machine Learning (AI/ML) models have been employed in telecommunication systems to improve the performance of telecommunications systems. For example, the AI/ML models have been employed for positioning of devices in a communication network. In this case, a large dataset of training samples may be used to train the AI/ML models to improve the positioning accuracy. However, positioning data of training samples such as labels may not be fully accurate. Therefore, it is worthy studying on processing noisy positioning data of training samples.

SUMMARY

In a first aspect of the present disclosure, there is provided a first apparatus. The first apparatus comprises at least one processor; and at least one memory storing instructions that, when executed by the at least one processor, cause the first apparatus at least to: obtain measurement data and first positioning data associated with the measurement data; generate second positioning data from the first positioning data based on network assistance information; and transmit at least the measurement data and the second positioning data.

In a second aspect of the present disclosure, there is provided a second apparatus. The second apparatus comprises at least one processor; and at least one memory storing instructions that, when executed by the at least one processor, cause the second apparatus at least to: transmit, to a first apparatus, network assistance information to be used by the first apparatus to generate second positioning data from first positioning data associated with measurement data; and receive, from the first apparatus, at least the measurement data and the second positioning data.

In a third aspect of the present disclosure, there is provided a third apparatus. The third apparatus comprises at least one processor; and at least one memory storing instructions that, when executed by the at least one processor, cause the third apparatus to: receive, from a first apparatus or a second apparatus, a request to transmit a rule to the first apparatus, the rule to be used by the first apparatus to generate second positioning data from first positioning data associated with measurement data; and in response to receiving the request, transmit network assistance information including the rule to the first apparatus.

In a fourth aspect of the present disclosure, there is provided a method. The method comprises: obtaining, at a first apparatus, measurement data and first positioning data associated with the measurement data; generating second positioning data from the first positioning data based on network assistance information; and transmitting at least the measurement data and the second positioning data.

In a fifth aspect of the present disclosure, there is provided a method. The method comprises: transmitting, at a second apparatus to a first apparatus, network assistance information to be used by the first apparatus to generate second positioning data from first positioning data associated with measurement data; and receiving, from the first apparatus, at least the measurement data and the second positioning data.

In a sixth aspect of the present disclosure, there is provided a method. The method comprises: receiving, at a third apparatus from a first apparatus or a second apparatus, a request to transmit a rule to the first apparatus, the rule to be used by the first apparatus to generate second positioning data from first positioning data associated with measurement data; and in response to receiving the request, transmitting network assistance information including the rule to the first apparatus.

In a seventh aspect of the present disclosure, there is provided a first apparatus. The first apparatus comprises means for obtaining measurement data and first positioning data associated with the measurement data; means for generating second positioning data from the first positioning data based on network assistance information; and means for transmitting at least the measurement data and the second positioning data.

In an eighth aspect of the present disclosure, there is provided a second apparatus. The second apparatus comprises means for transmitting, to a first apparatus, network assistance information to be used by the first apparatus to generate second positioning data from first positioning data associated with measurement data; and means for receiving, from the first apparatus, at least the measurement data and the second positioning data.

In a ninth aspect of the present disclosure, there is provided a third apparatus. The third apparatus comprises means for receiving, from a first apparatus or a second apparatus, a request to transmit a rule to the first apparatus, the rule to be used by the first apparatus to generate second positioning data from first positioning data associated with measurement data; and means for in response to receiving the request, transmitting network assistance information including the rule to the first apparatus.

In a tenth aspect of the present disclosure, there is provided a computer readable medium. The computer readable medium comprises instructions stored thereon for causing an apparatus to perform the method according to the fourth, the fifth or the sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
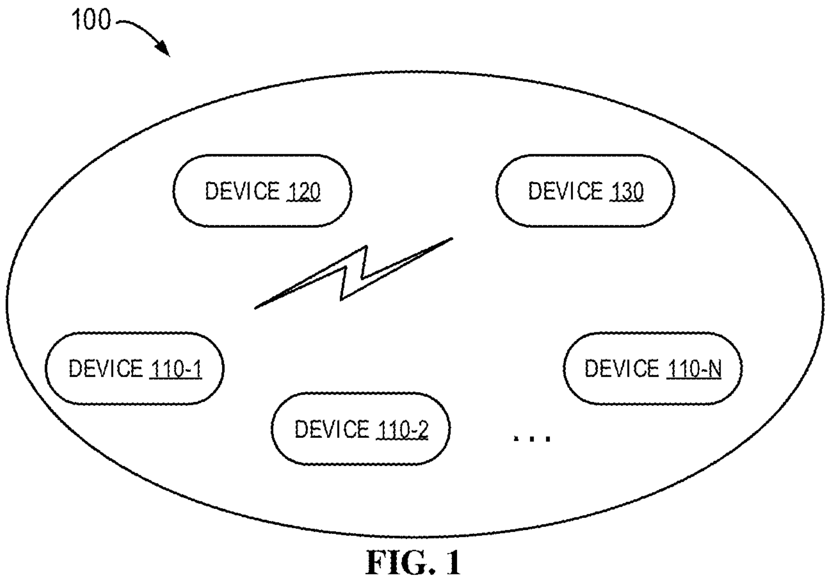
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" or "network access device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "model" is referred to as an association between an input and an output learned from training data, and thus a corresponding output may be generated for a given input after the training. The generation of the model may be based on a ML technique. The ML techniques may also be referred to as AI techniques. In general, a ML model can be built, which receives input information and makes predictions based on the input information. As used herein, a model is equivalent to an AI/ML model, or a data-driven/data processing algorithm/procedure.

As described above, an AI/ML model may be applied in the NR radio interface to assist model functionalities or communication-related functions, such as, Channel State Information (CSI) feedback overhead reduction, beam management, enhanced positioning, and the like. For example, the AI/ML-based positioning may be employed in positioning accuracy enhancements for different scenarios, for example, scenarios with heavy non-line-of-sight (NLOS) conditions.

The AI/ML model may be trained with a dataset of training samples. To better training the AI/ML model, a large dataset with accurate ground truth or clean label is needed. In the AI/ML based positioning, training the AI/ML models with supervised learning methodologies relies on obtaining a large amount of diverse training data characterized by clean labels. The labeled data collection is expected to happen with the network (NW) assistance, from field UEs (and potentially gNBs for assisted positioning). It is thus up to the UE to provide clean labels for the data.

As used herein, the term "label" or "positioning data" may refer to a value for a target parameter. For example, in AI/ML direct positioning scenarios, the term "label" or "positioning data" may refer to a value of a location of a device such as the UE location. For another example, in AI/ML assisted positioning scenarios, the term "label" or "positioning data" may also refer to a value of a positioning measurement such as time of arrival (TOC), channel impulse response (CIR) or the like. The term "clean label" or "clean positioning data" may be referred to a ground truth of the target parameter or an accurate value of the target parameter such as a true or actual value at a measurement time. The term "noisy label" or "noisy positioning data" may refer to an inaccurate value for the target parameter instead of the true or actual value at the measurement time.

For direct AI/ML based positioning, ground truth label may be a location of a device such as the UE location. In some example embodiments, a positioning reference unit (PRU) may be known of the location of the UE. The UE may generate location based on non-NR and/or NR RAT-dependent positioning methods. The LMF may generate the location of the UE based on positioning methods. The LMF may know the location of the PRU. In some cases, user data privacy needs to be preserved.

For AI/ML assisted positioning, ground truth label may be one or more of the intermediate parameter(s) corresponding to AI/ML model output. PRU may generate label directly or calculates based on measurement/location. The UE may generate a label directly or calculates based on measurement/location. A network entity such as the LMF may generate label directly or calculates based on measurement/location.

In some mechanisms, at least PRU is identified to generate ground truth label for UE-based positioning with UE-side model (Case 1) and UE-assisted positioning with UE-side model (Case 2a). At least LMF with known PRU location is identified to generate ground truth label for UE-assisted/LMF-based positioning with LMF-side model (Case 2b) and NG-RAN node assisted positioning with LMF-side model (Case 3b). At least network entity with known PRU location is identified to generate ground truth label for NG-RAN node assisted positioning with gNB-side model (Case 3a).

In some mechanisms, a quality indicator is proposed for and/or associated with ground truth label and/or measurement at least for model training. The quality indicator may be reported from the label and/or the measurement data generation entity and/or as request from a different (e.g., data collection, etc.) entity.

In some mechanisms, a time stamp is proposed at least for and/or associated with training data for model training. For example, separate time stamp for measurement and ground truth label are supported, when measurement and ground truth label are generated by different entities. The time stamp may be reported from data generation entity together with training data and/or as LMF assistance signaling.

For UE-based with UE-side model (Case 1) and UE-assisted positioning with UE-side (Case 2a) or LMF-side model (Case 2b), the PRU or the UE may generate other training data at least measurement corresponding to model input. For next generation (NG) radio access network (RAN) (NG-RAN) node assisted positioning with Network-side model (Case 3a and Case 3b), a transmit/receive point (TRP) may generate other training data at least measurement corresponding to model input.

In some mechanisms, the UE computes a label by non-AI/ML means e.g., using legacy positioning methods, based on non-NR and/or NR radio access technology (RAT)-dependent and/or NR RAT-independent. However, by doing so, the UE can only obtain an estimated label i.e., a noisy and thus not clean label. In many applications, it is difficult to obtain accurate labels (also referred to as golden labels) of the training samples.

Therefore, it is worthy studying on processing or denoising the noisy positioning data and training models by using training samples with denoised labels. As used herein, the term or "denoised label" or "denoised positioning data" may refer to an updated value for a target parameter generated by processing or denoising the "noisy label" or "noisy positioning data".

In the field of machine learning for video and image processing, several mechanisms have been proposed for processing noisy label or label denoising. In some mechanisms, it has been proposed to clean or discard samples with noisy labels. For example, prior to training, random training samples may be compared with samples for which the labels are known to be clean. Based on similarity analysis, whether the sample has a noisy label may be decided. For another example, during training, parallel neural networks (NNs) are trained, one based on clean labels and another one based on noisy labels. The two NN share the extraction layers. One NN is used to clean the noisy dataset.

In some mechanisms, it has been proposed to apply a neural network architecture to denoise labels. In the architecture, a noise layer is added to the end of a NN which has the purpose to multiply the output with the transition matrix between noisy and true label. The transition matrix itself is learned in parallel.

In some mechanisms, it has been proposed to apply a loss function(s) to denoise labels. The loss function may be modified to enable abstention. That is, the model is allowed to abstain from making a prediction on some data points at the cost of incurring an abstention penalty.

In some mechanisms, it has been proposed to use data re-weighting for noisy label processing. Those training samples that are more likely to have incorrect labels may be down weighted. It requires a separate dataset with clean labels, which was used to determine the weights assigned to the training data with noisy labels. For example, in some cases, methods based on the assumption that data samples with incorrect labels are likely to display unusually high loss values. For training data samples that are suspected of having incorrect labels, the gradients are scaled by $-\gamma$, where $0<\gamma<1$. In other words, a scaled gradient ascent is performed on the samples with incorrect labels.

In some mechanisms, it has been proposed to use data and label consistency for noisy label processing. For example, the true label is a hidden variable, and the ML model simultaneously learns the relation between true and noisy labels (i.e., label noise distribution). An auto-encoder model may be used to reconstruct the data from the hidden variables.

In some mechanisms, it has been proposed to use several training procedures for noisy label processing. In a training procedure for curriculum learning, a model may be trained with examples of increasing complexity or difficulty. In a training procedure for knowledge distillation, an auxiliary model may be trained on a small dataset with clean labels to guide the training of the main model on a large dataset with noisy labels. In a training procedure for joint training of more than one model, e.g., simultaneously training two separate but identical networks with random initialization, the network parameters may be only updated when the predictions of the two networks differ. In some training procedure, the settings of the training pipeline such as learning rate and regularization may be modified. For example, training strategies in terms of the order of using different datasets during training and proper learning rate adjustments based on the level of label noise in each dataset are proposed.

However, these mechanisms are proposed for the machine learning applications for video and image processing. For the AI/ML based positioning, it lacks an efficient approach for noisy label processing. In some mechanisms, for evaluation of AI/ML based positioning, it is proposed to study the performance impact from availability of the ground truth labels. For example, some training data may not have ground truth labels. The learning algorithm (e.g., supervised learning, semi-supervised learning, unsupervised learning) may be reported. However, how to obtain clean label or clean positioning data once the UE is deployed in the field still remains as one of the most important open questions.

In order to solve at least part of the above problems or other potential problems, a solution on measurement repetition is proposed. According to example embodiments, a first apparatus (for example, a terminal device or a network device) obtains measurement data and noisy positioning data associated with the measurement data.

The first apparatus generates denoised positioning data from the noisy positioning data based on network assistance information. In some example embodiments, the network assistance information may be transmitted to the first apparatus from a second apparatus (for example, a core network device such as a lifecycle management) or a third apparatus (such as another terminal device). The first apparatus transmits at least the measurement data and the denoised positioning data, for example to the second apparatus or the third apparatus. In this way, an accuracy of the positioning data can be improved. The AI/ML based positioning can thus be enhanced based on the denoised positioning data.

Principle and implementations of the present disclosure will be described in detail below with reference to FIGS. 1-11.

FIG. 1 illustrates an example communication environment 100 in which example embodiments of the present disclosure can be implemented. The communication environment 100 includes a device 110-1, a device 110-2, . . . , and a device 110-N, which can be collectively referred to as "device(s) 110", or individually referred to as a "device 110". The communication environment 100 also includes a device 120 and a device 130. The device(s) 110, the device 120 and the device 130 can communicate with each other.

In the example of FIG. 1, the device 110 may include a terminal device and the device 130 may include a network device serving the terminal device. The device 120 may include a core network device. For example, the device 120 may include a device on which a location management function (LMF) may be implemented.

In some example embodiments, an ML unit may be located within the communication environment 100. For example, the ML unit may be as part of the LMF implemented on the device 120. For another example, the ML unit may be implemented on the device 110 or device 130. The ML unit trains the AI/ML model for positioning by using training samples. The ML unit may be any suitable unit for data analyzing.

In some example embodiments, the ML unit may collect training samples from a set of data collection devices deployed in certain locations. The data collection device may include a positioning reference unit (PRU) or any other suitable data collection devices. The PRUs are reference units such as devices or network nodes at known locations (that is, having label information). PRUs may take measurements to generate correction data used for refining the location of other target device in the area.

In some example embodiments, the device 110, the device 120 and/or device 130 may perform as the data collection device. For example, the device 110, the device 120 and/or device 130 may provide positioning measurements or estimations in addition to its/their own position(s) via radio access network (RAN) or non-RAN. The positioning information provided by the device 110, the device 120 and/or device 130 is collected in the communication environment 100, thus may be used to analyze the propagation properties of the communication environment 100.

The ML unit may use a training dataset which may include positioning measurements from different PRUs or from different devices to train a localization ML framework. The trained ML framework may be deployed at network entities running ML processes and/or algorithms.

It is to be understood that the number of devices and their connections shown in FIG. 1 are only for the purpose of illustration without suggesting any limitation. The communication environment 100 may include any suitable number of devices configured to implementing example embodiments of the present disclosure. Although not shown, it would be appreciated that one or more additional devices may be located in the cell of the device 130, and one or more additional cells may be deployed in the communication environment 100. It is noted that although illustrated as a network device, the device 130 may be other device than a network device. Although illustrated as a terminal device, the device 110 may be other device than a terminal device.

In the following, for the purpose of illustration, some example embodiments are described with the device 110 operating as a terminal device and the device 130 operating as a network device. However, in some example embodiments, operations described in connection with a terminal device may be implemented at a network device or other device, and operations described in connection with a network device may be implemented at a terminal device or other device.

In some example embodiments, if the device 110 is a terminal device and the device 130 is a network device, a link from the device 130 to the device 110 is referred to as a downlink (DL), while a link from the device 110 to the device 130 is referred to as an uplink (UL). In DL, the device 130 is a transmitting (TX) device (or a transmitter) and the device 110 is a receiving (RX) device (or a receiver). In UL, the device 110 is a TX device (or a transmitter) and the device 130 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
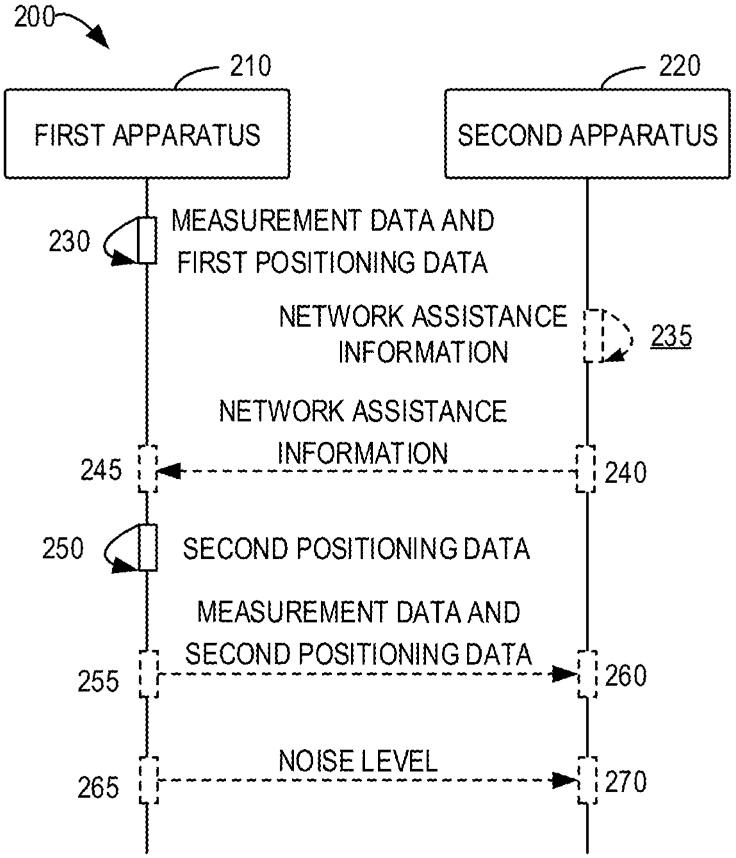
FIG. 2 illustrates a signaling diagram for noisy positioning data processing according to some example embodiments of the present disclosure.

As briefly mentioned above, the accuracy of the positioning data can be improved based on the network assistance information. FIG. 2 illustrates a signaling diagram 200 for noisy positioning data processing according to some example embodiments. The signaling diagram 200 involves a first apparatus 210 and a second apparatus 220.

In some example embodiments, the first apparatus 210 may refer to or include the device 110 or device 130 shown in FIG. 1. The second apparatus 220 may refer to or include the device 120 shown in FIG. 1. It is to be understood that the first apparatus 210 and second apparatus 220 may refer to or include any proper devices, including but not limited to a UE, a PRU, a transmit/receive point (TRP), a gNB, a next generation (NG) radio access network (RAN) (NG-RAN) node, or a network element such as LMF. Scope of the present disclosure is not limited in this regard.

Although a single first apparatus 210 and a single second apparatus 220 are illustrated in FIG. 2, it would be appreciated that there may be a plurality of apparatuses performing similar operations as described with respect to the first apparatus 210 or the second apparatus 220 below.

It is noted that embodiments of the present disclosure can be applied to any proper scenarios, for example, beam management, positioning accuracy enhancement, or CSI. Only for purpose of illustrations, example embodiments of the present disclosure are described with reference to the scenario of positioning accuracy enhancements.

In operation, the first apparatus 210 obtains (230) measurement data and first positioning data associated with the measurement data. The measurement data may be inputted to the AI/ML model for model training or model inference. As used herein, the measurement data may also be referred to as "model input". The measurement data may be reported from the measurement data generation entity. The measurement data generation entity may be implemented on the first apparatus 210. Examples of the measurement data generation entity may include but not limited to UE, PRU or TRP.

In some example embodiments, the measurement data generation entity may be generated based on reference signal (RS). RS(s) configuration may be a request from the first apparatus 210 such as the measurement data generation entity to the second apparatus 210 such as an LMF and/or as LMF assistance signaling to the first apparatus 210. The measurement data generation entity may generate the measurement data based on the RS(s). For example, the measurement data may be a radio measurement or a positioning measurement such as a measurement of field NR signals. The measurement data may include any combination of time, angle of arrival, channel impulse response (CIR), etc.

In some example embodiments, the first positioning data may include a coordinate of the first apparatus 210 such as UE coordinates. Alternatively, or in addition, the first positioning data may include assistance positioning data such as a binary identifier of line of sight (LOS) or non-line of sight (NLOS), or time of arrival (ToA), and/or the like. The first positioning data may be determined by the first apparatus 210. The first positioning data may not be the ground truth positioning data. As used herein, the first positioning data may also be referred to as noisy positioning data.

The first apparatus 210 generates (250) second positioning data from the first positioning data based on network assistance information. As used herein, the second positioning data may be referred to as denoised positioning data.

In some example embodiments, the first apparatus 210 may generate (250) the second positioning data from the first positioning data based on the network assistance information received (245) from the second apparatus 220. The second apparatus 220 may determine (235) the network assistance information. The second apparatus 220 may transmit (240) the network assistance information to the first apparatus 210.

In some example embodiments, the first apparatus 210 includes the device 110 such as a terminal device. In such cases, the first apparatus 210 may receive the network assistance information from the second apparatus 220 via an LTE positioning protocol (LPP) information element (IE), such as label denoiser (LD)-config. In such cases, the network assistance information may also be referred to as LPP assistance data.

Alternatively, or in addition, in some example embodiments, the first apparatus 210 includes the device 130 such as a network device. In such cases, the first apparatus 210 may receive the network assistance information from the second apparatus 220 via an NR positioning protocol annex (NRPPa) IE or any other suitable signaling. It is to be understood the IEs described hereinafter is only for the purpose of illustration, without suggesting any limitation. The apparatuses may transmit information with any suitable IE or other information format. Scope of the present disclosure is not limited in this regard.

In some example embodiments, the network assistance information may include a rule to be applied to generate the second positioning data from the first positioning data. As used herein, the term "rule" may also be referred to as a "label denoiser" or "LD". In some example embodiments, the network assistance information may include a plurality of rules to be applied to generate the second positioning data from the first positioning data. The one or more rules may be determined by the second apparatus 220. The one or more rules may be open format.

In some example embodiments, the rule is related to a positioning technology. The positioning technology may be any available proprietary or legacy positioning method, such as radio access technology (RAT) or non-RAT positioning technology.

If the positioning technology is a global navigation satellite system (GNSS) positioning technology, the rule may be a specific GNSS label denoising rule or a specific GNSS label denoiser. If the positioning technology is a NR positioning technology, the rule or LD may be a NR label denoising rule or NR LD. Likewise, the rule or LD may be classified into WiFi LD or 5G LD or any other specific rule or LD based on its corresponding positioning technology. Alternatively, the rule may be agnostic to the positioning technology.

In some example embodiments, the rule is related to a positioning area. For example, the rule or LD may be determined for a specific area in a cell.

Alternatively, or in addition, in some example embodiments, the rule is related to a type of the first apparatus 210. The type of the first apparatus 210 may include but not limited to pedestrian, V2X, and/or the like.

Figure 3:
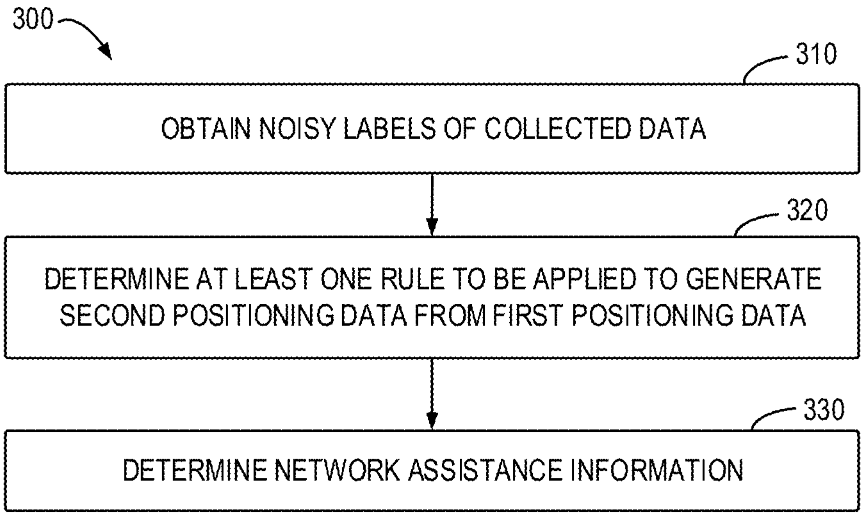
FIG. 3 illustrates a flowchart of a process for determining a rule for noisy positioning data processing according to some example embodiments of the present disclosure.

The rule or LD may be determined by the second apparatus 220. The second apparatus 220 may determine (235) the network assistance information based on the determined one or more rules. FIG. 3 illustrates an example process 300 for determining the network assistance information. The process 300 may be implemented by the second apparatus 220.

At block 310, the second apparatus 220 may obtain noisy labels of collected data such as collected measurement data. In some example embodiments, the second apparatus 220 may generate artificial but known noisy labels. That is, the noisy label may be generated without assistance of the first apparatus. In this way, the second apparatus 220 may further determine the rule without UE assistance.

Alternatively, or in addition, in some example embodiments, the second apparatus 220 may collect data with assistance from the first apparatus 210 such as perfect labels from PRUs in the field. The assistance may indicate at least the experience signal to noise radio (SNR) conditions at the first apparatus 210. In this way, the second apparatus 220 may further determine the rule with UE assistance.

At block 320, the second apparatus 220 may determine at least one rule to be applied to generate second positioning data from first positioning data. For example, the second apparatus 220 may compute a rule which is either agnostic or specific to the positioning technology such as GNSS, NR, etc.

At block 330, the second apparatus 220 may determine the network assistance information. For example, the second apparatus 220 may include the at least one rule in the network assistance information. In some example embodiments, the second apparats 220 may include further information in the network assistance information.

Taking an NR-specific rule or denoiser as an example, the second apparatus 220 may collect data with perfect labels from NR simulations, or ray tracing tools. Alternatively, or in addition, in some example embodiments, the second apparatus 220 may collect data with perfect labels from NR PRUs in the field.

At block 310, the second apparatus 220 may further artificially generate addictive white Gaussian noise (AWGN) with different variances or any other suitable noise and apply the generated noise onto the perfect labels. For example, for direct AI/ML based positioning, the ground truth label error in each dimension of x-axis and y-axis may be modeled as a truncated Gaussian distribution with zero mean and standard deviation of L meters, with truncation of the distribution to the [−2*L, 2*L] range. Value L is up to sources. Based on such truncated Gaussian distribution, the AWGN noise may be generated.

Taking AI/ML assisted positioning with TOA as model output as an example, the ground truth label error of TOA may be calculated based on location error. The location error in each dimension of x-axis and y-axis may be modelled as a truncated Gaussian distribution with zero mean and standard deviation of L meters, with truncation of the distribution to the [−2*L, 2*L] range. Value L is up to sources. Other timing information, e.g., reference signal time difference (RSTD), as model output is not precluded.

For AI/ML assisted positioning with LOS/NLOS indicator as model output, the ground truth label error of LOS/NLOS indicator may be modelled as m % LOS label error and n % NLOS label error. Value m and n are up to sources.

Based on these label error model, the AWGN noise may be generated. It is to be understood that these models are only for purpose of illustration, without suggesting any limitation. Any other suitable noise model can be applied. Scope of the present disclosure is not limited in this regard.

In some example embodiments, in evaluation of AI/ML assisted positioning with timing information (e.g., TOA) as model output, for L in the range of 0.25 m to 5 m, the timing (e.g., TOA) estimation error and positioning error increases approximately in proportion to L, where L (in meters) is the standard deviation of truncated Gaussian distribution of the ground truth label error.

In some example embodiments, an evaluation shows that AI/ML assisted positioning with timing information (e.g., ToA) as model output is robust to certain label error based on evaluation results of L in the range of (0, 5) meter. The exact range of label error that can be tolerated depends on the positioning accuracy requirement, where tighter positioning accuracy requirement demands smaller label error.

In addition, an evaluation shows that direct AI/ML positioning is robust to certain label error based on evaluation results of L in the range of (0, 5) meter. The exact range of label error that can be tolerated depends on the positioning accuracy requirement, where tighter positioning accuracy requirement demands smaller label error. These evaluations may be used for generating the AWGN noise.

In this way, the second apparatus 220 may know, for each observation point the following: an input feature set (e.g., channel impulse response (CIR), power delay profile (PDP), or the like), a perfect label L (e.g., LOS probability, TOA, 2D location, 3D location, height, or the like), and a noisy label Ln. As used herein, the input feature set may be referred to as “a”, the prefect label L may be referred to as “b”, and the noisy label Ln may be referred to as “c”. At block 320, the second apparatus 220 may determine a NR-specific rule based on the generated noisy labels.

Similar procedure may be used to obtain a GNSS-specific rule or label denoiser. In case the second apparatus 220 prepares a technology-agnostic denoiser, then the second apparatus 220 may collect observation points from NR PRUs, GNSS PRUs, NR simulations, GNSS simulations etc., and generate the input feature set, the perfect label L and the noisy label Ln using all collected data.

In some example embodiments, the second apparatus 220 may use the pairs (the perfect label L, the noisy label Ln) to train a rule or label denoiser which takes as input the noisy label Ln and needs to learn how to produce an estimate of the perfect label L. As an exemplary implementation, LD may be implemented as a denoising autoencoder, trained with a cost function e.g., that minimizes the error between the perfect label L and the estimate L (e.g., mean squared error, cross entropy, etc. depending on the label type).

The second apparatus 220 may then collect the parameter setting (architecture, depth, activation functions, weights and biases) of the LD in the LPP assistance data LD-config. At block 330, the second apparatus 220 may determine the network assistance information based on one or more LD-config(s). The second apparatus 220 may transfer the network assistance information such as LPP assistance data LD-config(s) to the first apparatus 210 in message 3.

Alternatively, in some example embodiments, realistic noise profiles instead of artificially generated AWGN (with different variances) may be used to determine the rule. In fact, PRU may have ideal labels (without any noise). In addition, the labels may be generated by using conventional manners (such as GNSS) to get the noisy labels. Thus, PRU may have the following for each observation sample: input feature set (e.g., CIR, PDP, or the like) (referred to as “a”), a perfect label L (referred to as “b”) which is already known such as LOS probability, TOA, 2D location, 3D location, height, or the like, and a noisy label Ln (referred to as “c”) which is estimated using conventional localization method such as GNSS. The rule or the LD may then be trained similarly by using (b, c) pairs.

Referring back to FIG. 2, if a technology specific LD has been generated, then the second apparatus 220 may transmit (240) to the first apparatus 210 the corresponding LD-config (one or more LD-configs, depending on the positioning capabilities of the first apparatus 210).

In some example embodiments, the network assistance information may include an application condition of the rule. For example, the second apparatus 220 may mark the one or more LD-configs. Each LD-config may carry a field describing the technology for which it is applicable.

As mentioned, the first apparatus 210 obtains the measurement data and the first positioning data (corresponding to a pair (a, c), that is a pair of input features and noisy labels). The first apparatus 210 may store the measurement data and the first positioning data. The first apparatus 210 then determines (250) the second positioning data based on the received (245) network assistance information. For example, the first apparatus 210 may determine (250) the second positioning data by applying the rule or LD onto the first positioning data such as noisy labels. The rule or LD may produce a clean version of labels. The clean version of labels may be referred to as the second positioning data. In some example embodiments, the rule applied to the first positioning data may be selected from a plurality of rules included in the network assistance information based on the applicable condition included in the network assistance information or based on any other suitable condition.

In some example embodiments, the first apparatus 210 may transmit (255) at least the measurement data and the second positioning data to the second apparatus 220. For example, the first apparatus 210 may transmit (255) the measurement data, the first positioning data and the second positioning data (for example, the tuple (a, b, c)) to the second apparatus 220 via message 5. It is beneficial for the second apparatus 220 to obtain both the clean and the noisy label so that the second apparatus 220 can compute positioning corrections to be applied to other first apparatus 210 or devices performing legacy positioning sessions.

In some example embodiments, the network assistance information may include an indication that reception of the measurement data and the second positioning data is prioritized. If the network assistance information includes such indication, the first apparatus 210 may transmit (255) the measurement data and the second positioning data to the second apparatus 220, without the first positioning data. For cases in which the second apparatus 220 reports high overhead in the radio interface, prioritizing only the denoised tuple information (a, b) may help to reduce the overhead.

In some example embodiments, the first apparatus 210 may indicate which rule or what LD-config being used for each reported tuple (a, b, c). This is beneficial since the second apparatus 220 may use technology-specific weights to weight the importance of the different tuples in the over the second apparatus 220 of the AIML positioning model.

In some example embodiments, the network assistance information may include a request for a noise level during a time period within an area. That is, the second apparatus 220 may request the first apparatus 210 to report its experienced noise level over a time window T for the given region of interest (ROI).

In response to receiving the request for noise level, the first apparatus 210 may transmit (265) the noise level during the time period within the area to the second apparatus 220. The second apparatus 220 may receive (270) the noise level. In this way, the first apparatus 210 may indicate the second apparatus 220 its experienced noise level over requested time window for the given positioning method.

With the received (270) noisy level, the second apparatus 220 may apply the given noise level to artificially generated labels to prepare the suitable rule or LD for the given positioning method.

In some example embodiments, the second apparatus 220 may configure the first apparatus 210 the time window for reporting the noise level (periodic reporting). For example, the second apparatus 220 may configure the time window for noise reporting based on mobility conditions of the first apparatus 210, radio environment characteristics, LOS/NLOS conditions, or the like. In this way, less often reporting can be achieved.

In some example embodiments, the first apparatus 210 may determine whether to transmit (265) the noise level to the second apparatus 220 based on a threshold level. If the noise level is greater than or equal to a threshold level, the first apparatus 210 may transmit (265) the noise level to the second apparatus 220. Otherwise, the first apparatus 210 may not report the noise level. That is, the first apparatus 210 may proactively report the noise level based on the noise level greater than or equal to the threshold level. Otherwise, the first apparatus 210 may keep silent.

In some example embodiments, the network assistance information further includes the threshold level. For example, the second apparatus 220 may share the supported noise threshold for the determine LD-config as part of the network assistance information.

In some example embodiments, the second apparatus 220 may design a rule or LD for a specific area in a cell. Such rule or LD may be obtained using assistance information from the first apparatus 210. For example, the second apparatus 220 may request the first apparatus 210 to report its experience noise level over time window T and region of interest (ROI). The second apparatus 220 may apply the given noise level to the artificially generated labels. The second apparatus 220 may prepare the suitable rule or LD for the given positioning method.

If the first apparatus 210 is in static environment, the second apparatus 220 may increase the time window for the noise reporting. In another embodiment, if the first apparatus 210 experiences noise level above the threshold level of the configured LD, first apparatus 210 may proactively report the new value for the noise level otherwise first apparatus 210 keeps silent.

It is to be understood that although a single first apparatus 210 is shown in the signaling diagram 200, in some example embodiments, the second apparatus 220 may broadcast the network assistance information to a group of first apparatuses in a cell.

Example embodiments regarding including the rule for denoising the noisy label and/or other information have been described. As described, the rule or LD may be determined by the second apparatus 220. A detailed example regarding the determination of the rule will be described below.

In the following description, it is assumed that the positioning reference signal (PRS) sample is labeled with the 2D location of the first apparatus 210. If such location estimate is obtained from cellular positioning, the first apparatus 210 may use a RAT-tuned denoiser to correct the original location estimate. The RAT-tuned denoiser (RAT-denoiser) may be configured by the second apparatus 220 via the parameters sent in LD-config.

In an example embodiment, the rule such as the RAT-denoiser (referred to as a first denoiser herein) receives the following as input: the location estimate as obtained by the first apparatus 210: p=[x,y], and the estimated SINR for each detected PRS e.g.: s=[SINR($PRS_1$),SINR($PRS_2$), . . . ].

A set of non-linear operations characterized by functions $\{f_1, \ldots f_N\}$ may be implemented on the input to produce a corrected label pc=[xc, yc], which ideally closely approaches the true location pt=[xt, yt]. The RAT-denoiser may be described as performing the operation:

$$pc = f_N(f_{N-1}(\ldots f_1(p, s))). \tag{1}$$

To implement (1), the first apparatus 210 may receive in LD-config a set of functions $\{\tilde{f}_1, \ldots \tilde{f}_N\}$, where $\tilde{f}_k$ denotes an instance of function $f_k$ in (1) (k being 1, . . . , N). The first apparatus 210 may further receive in LD-config the order in which the operations or functions $\tilde{f}_1, \ldots \tilde{f}_N$ are applied, and information of what input to be used in each function, for example, the location estimate p and the estimated SINR s.

In some example embodiments, the set of functions $\{\tilde{f}_1, \ldots \tilde{f}_N\}$ may be obtained by the second apparatus 220. That is, it is up to the implementation of the second apparatus 220 to generate the RAT-denoiser, i.e., determine $\tilde{f}=\{\tilde{f}_1, \ldots \tilde{f}_N\}$, where $\tilde{f}_k$ denotes an instance of function $f_k$ obtained by the second apparatus 220 (k being 1, . . . , N). The determination is implementation specific, but for purposes of illustration, training a neural network that implements (1) with a cost function that minimizes the Euclidian distance E(pc, pt) between pc and the true label pt may be considered. For example, the $\tilde{f}$ may be determined by (2):

$$\tilde{f} = \underset{f}{\operatorname{argmin}} E(f_N(f_{N-1}(\ldots f_1(p, s))), pt). \tag{2}$$

In another embodiment, each function $f_k$ may describe a linear displacement of the input e.g., $f_k(p)=a_k p+b_k$, where the coefficients $a_k$, $b_k$ are determined using a similar cost function, and PRU measurements (i.e. PRU known location serves as pt and PRU estimated location serves as pc).

Take another example where the label is the vector consisting of {DL angle of departure (AoD) ϕ, LOS indicator g}: v=[ϕ,g]. The first apparatus 210 may obtain the label v and corrects it with a denoiser (referred to as a second denoiser) which may be: using the following input: v, s, etc. The second denoiser may apply another set of operations on the inputs, either jointly or independently on each input. The second denoiser may output the corrected label $v_c=[\phi_c, g_c]$ so that $v_c \rightarrow v_t$, where $v_t$ is the ideal label.

For example, the second denoiser may implement two independent corrections $f_\phi$, $f_g$, one for the DL AoD and one for the LOS:

$$\phi_c = f_\phi(\phi, s),$$

$$g_c = f_g(g, s),$$

where the estimated DL AoD is rotated according to $f_\phi$ and the LOS indicator is modified according to function $f_g$ e.g.: $f_\phi(\phi,s)=\phi+\Delta\phi(s)$, where the rotation angle is proportional to the SINR level.

It is to be understood that the above equations or parameters are only for purpose of illustration, without suggesting any limitation. Any suitable denoising rule or operations will be applied. Scope of the present disclosure is not limited in this regard.

Several embodiments regarding determining the denoised positioning data based on the network assistance information and several embodiments regarding the network assistance information have been described. With the network assistance information, the cleanliness of collected data when the first apparatus 210 such as UE is triggered for data collection is improved. The positioning accuracy is thus improved whenever it is triggered for any type of positioning session, AI/ML based or legacy. Accordingly, AI/ML positioning models which have been initially trained by the UE vendor, and to which the LMF does not have access can be updated. Moreover, extra overhead for use cases in which the LMF assists UEs on denoising the dataset in UE-side models can be avoided.

In the example embodiments described with respect to FIG. 2, the network assistance information may be determined by the second apparatus 220 and transmitted by the second apparatus 220 to the first apparatus 210. In some example embodiments, the network assistance information may instead be transmitted from a third apparatus instead of the second apparatus 220.

Figure 4:
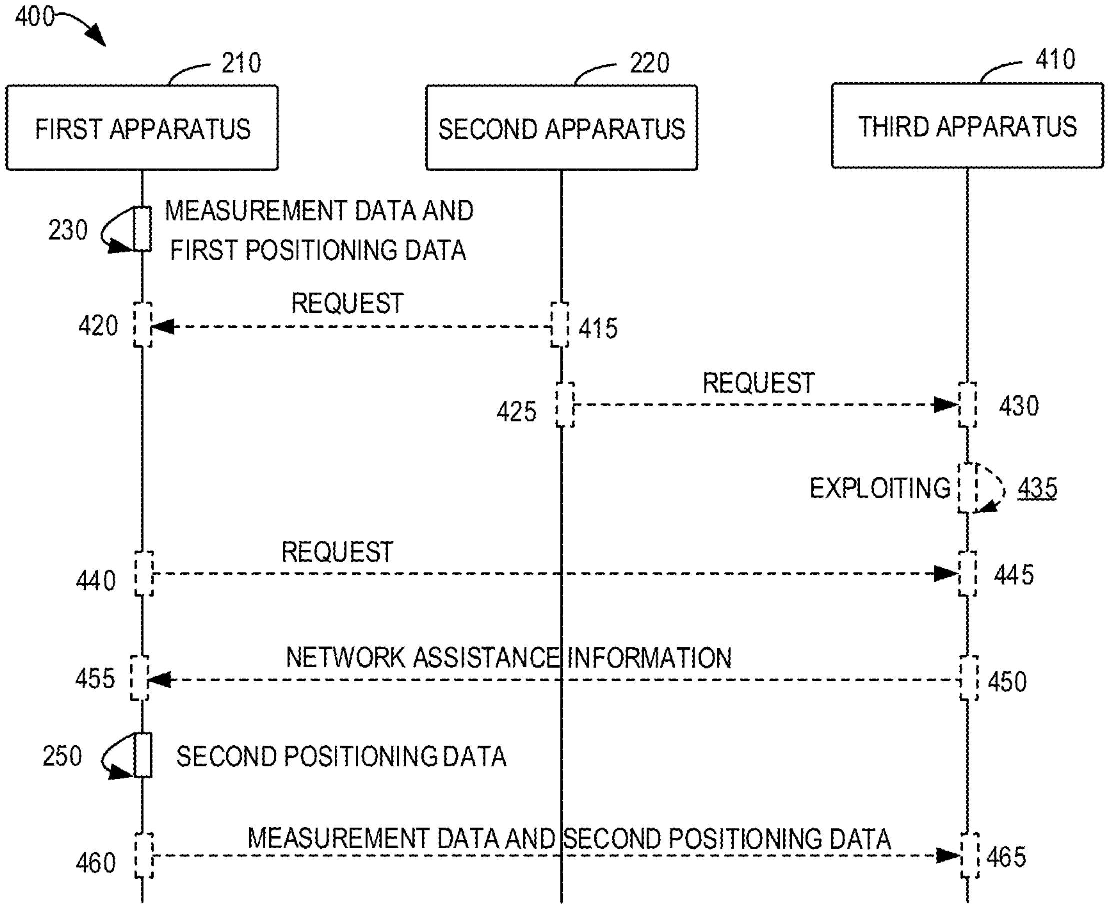
FIG. 4 illustrates another signaling diagram for noisy positioning data processing according to some example embodiments of the present disclosure.

FIG. 4 illustrates another signaling diagram 400 for noisy positioning data processing according to some example embodiments of the present disclosure. The signaling diagram 400 involves the first apparatus 210, the second apparatus 220 and a third apparatus 410.

In some example embodiments, the first apparatus 210 may refer to or include the device 110 or device 130 shown in FIG. 1. The second apparatus 220 may refer to or include the device 120 shown in FIG. 1. The third apparatus 410 may refer to or include another device 110 or device 130 shown in FIG. 1. In the following description, it is assumed that the third apparatus 410 refers to or include a PRU.

Although a single first apparatus 210, a single second apparatus 220 and a single third apparatus 410 are illustrated in FIG. 2, it would be appreciated that there may be a plurality of apparatuses performing similar operations as described with respect to the first apparatus 210 or the second apparatus 220 or the third apparatus 410 below.

It is noted that embodiments of the present disclosure can be applied to any proper scenarios, for example, beam management, positioning accuracy enhancement, or CSI. Only for purpose of illustrations, example embodiments of the present disclosure are described with reference to the scenario of positioning accuracy enhancements.

Similar to the signaling diagram 200, the first apparatus 210 obtains (230) measurement data and first positioning data associated with the measurement data. Different from the signaling diagram 200, in the example of FIG. 4, the first apparatus 210 may receive (455) the network assistance information from the third apparatus 410. The network assistance information may include at least a rule to be used by the first apparatus 210 to generate second positioning data from the first positioning data. The first apparatus 210 determines (250) the second positioning data from the first positioning data based on the network assistance information.

In some example embodiments, the second apparatus 220 may transmit (415), to the first apparatus 210, a request to receive a rule to be applied to generate the second positioning data from the first positioning data from a third apparatus 410. For example, the second apparatus 220 may transmit (415) a request to get "local" rule or LD from sidelink (SL) to the first apparatus 210. The first apparatus 210 may receive (420) the request.

Alternatively, or in addition, in some example embodiments, the second apparatus 220 may transmit (425), to the third apparatus 410, a request to transmit the rule to the first apparatus. For example, the second apparatus 220 may transmit (425) a request to share "local" rule or LD via sidelink to the third apparatus 410. The third apparatus 410 may receive (430) the request.

In some example embodiments, the third apparatus 410 may exploit (435) the neighboring apparatuses via sidelink. For example, the third apparatus 410 may exploit (435) the first apparatus 210.

In some example embodiments, the first apparatus 210 may transmit (440), to the third apparatus 410, a request for a rule to be applied to generate the second positioning data from the first positioning data. The third apparatus 410 may receive (445) the request. In some example embodiments, the first apparatus 210 may transmit (440) the request for the rule in response to receiving (420) the request from the second apparatus 220.

In response to receiving (430/445) the request, the third apparatus 410 may transmit (450) network assistance information including the rule to the first apparatus 210. The network assistance information includes the rule. The first apparatus 210 may receive (455) the network assistance information.

It is to be understood that the network assistance information transmitted (450) by the third apparatus 410 may include one or more rules or LDs. The one or more rules or LDs may be agnostic to a positioning technology or related to a positioning technology. The one or more rules may be related to a positioning area and/or a type of the first apparatus 210. Details of the rule(s) have been described with respect to FIG. 2, which will not be repeated here. The one or more rules may be determined by the third apparatus 410. Determination of the one or more rules may be similar to the determination of the rule(s) by the second apparatus 220, which will not be repeated here.

In some example embodiments, the network assistance information may also include further information mentioned with respect to FIG. 2. For example, the further information such as an applicable condition of the rule, an indication that reception of the measurement data and the second positioning data is prioritized, a request for a noise level during a time period within an area, or a threshold level for the noise level may be determined by the third apparatus 410 itself or alternatively determined by the second apparatus 220 and transmitted to the third apparatus 410.

Alternatively, in some example embodiments, the network assistance information transmitted (450) by the third apparatus 410 may include the one or more rules or LDs. Other information such an applicable condition of the rule, an indication that reception of the measurement data and the second positioning data is prioritized, a request for a noise level during a time period within an area, or a threshold level for the noise level may be transmitted by the second apparatus 220 to the first apparatus 210.

In some example embodiments, the first apparatus 210 may transmit (460) at least the measurement data and the second positioning data to the third apparatus 410. The third apparatus 410 may receive (465) at least the measurement data and the second positioning data from the first apparatus 210. For example, the first apparatus 210 may transmit (460) the measurement data, the first positioning data and the second positioning data to the third apparatus 410.

In other words, the rule or the LD may be prepared by a UE (or PRU as it is fixed position) and then shared with the other neighboring UEs via sidelink. In such cases, a "local" area denoiser can be prepared and trained. UEs in the vicinity of the PRU can thereafter get the 'local' denoiser via sidelink request.

In this way, an accuracy of the positioning data can be improved based on the local area LD. The AI/ML based positioning can thus be enhanced based on the denoised positioning data.

Figure 5A:
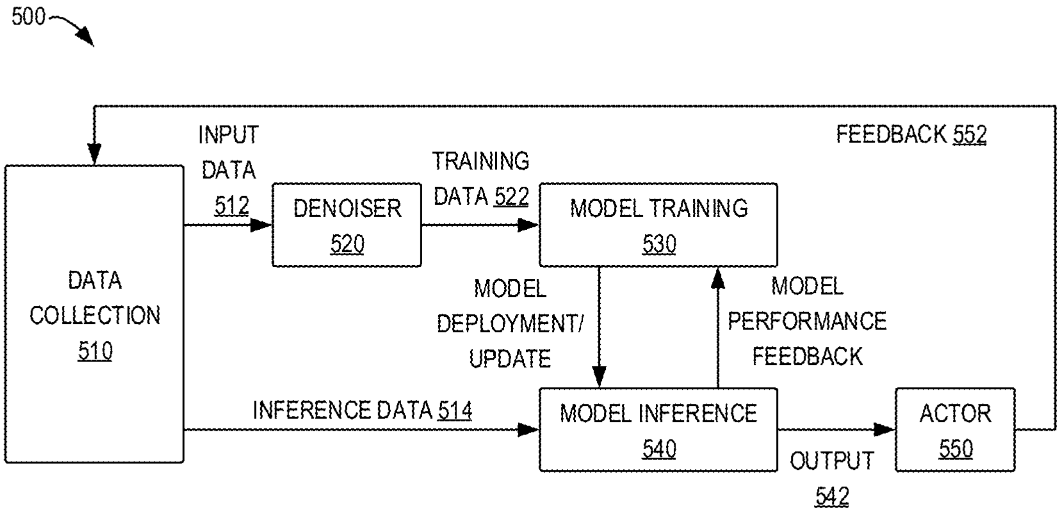
FIG. 5A and FIG. 5B illustrate example framework of AI/ML based positioning with the noisy positioning data processing according to some example embodiments of the present disclosure, respectively.

Several example embodiments regarding processing noisy positioning data or noisy label based on the network assistance information have been described. In some example embodiments, the network assistance information or the rule for processing the noisy positioning data may be implemented in the framework of AI/ML based positioning. FIG. 5A illustrates an example framework 500 of AI/ML based positioning with the noisy positioning data processing according to some example embodiments of the present disclosure. The framework 500 may be implemented at the first apparatus 210, such as the device 110 or device 130 or a PRU labels the training data.

In the framework 500, a data collection module 510 is included. The data collection module 510 may be configured to collect measurement data together with first positioning data. The data collection module 510 may further store a percentage of training data without label, if incomplete labeling is considered in the evaluation. Imperfection of the ground truth labels may be determined.

The data collection module may further be configured to transmit input data 512 to the denoiser 520. The input data 512 may include the measurement data together with the first positioning data. The denoiser 520 may be a module based on the network assistance information. For example, the denoiser 520 may use one or more rules included in the network assistance information to generate second positioning data from the first positioning data.

In some example embodiments, the denoiser 520 may be configured to transmit training data 522 to a model training module 530. The training data may include the measurement data and the second positioning data such as the denoised label. The model training module 530 may be configured to train the AI/ML model for positioning based on the training data 522.

In this way, the training data such as the training labels are being cleaned before the samples are used for training. In this way, the AI/ML model can be better trained.

In some example embodiments, the model training module 530 and a model inference module 540 may be integrated in the framework 500. For example, the model training module 530 may deploy or update the model used in the model inference module 540. The model performance feedback of the model inference module 540 may be feedback to the model training module 530.

The data collection module 510 may transmit inference data 514 to the model inference module 540. The inference data 514 may include the measurement data and the second positioning data. The model inference module 540 may be configured to determine an output 542 based on the inference data 514 by using the trained AI/ML model.

The output 542 of the model inference module 540 may be transmitted to an actor 550. The actor 550 may be configured to perform a random access network (RAN) intelligence operation or function. Scope of the present disclosure is not limited in this regard. Feedback 552 may be transmitted from the actor 550 to the data collection module 510.

In this way, the network assistance information such as the rule or LD can be used for training function integrated within a functional framework for RAN intelligence.

Figure 5B:
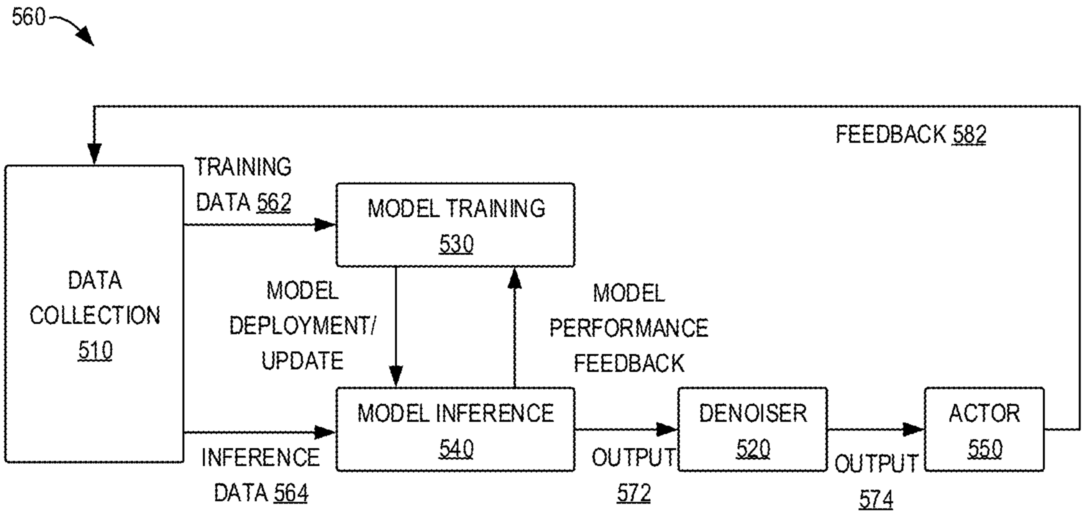

FIG. 5B illustrates another example framework 560 of AI/ML based positioning with the noisy positioning data processing according to some example embodiments of the present disclosure. Similar to the framework 500, a data collection module 510 is included in the framework 560. The data collection module 510 may be configured to collect measurement data together with first positioning data. The data collection module may further be configured to transmit input data 562 to the model training model 530. The input data 562 may include the measurement data together with the first positioning data. The model training module 530 may use the input data 562 to train the AI/ML model.

In some example embodiments, the model training module 530 and a model inference module 540 may be integrated in the framework 500. For example, the model training module 530 may deploy or update the model used in the model inference module 540. The model performance feedback of the model inference module 540 may be feedback to the model training module 530.

The data collection module 510 may transmit inference data 564 to the model inference module 540. The inference data 514 may include the measurement data and the first positioning data. The model inference module 540 may be configured to determine an output 572 based on the inference data 564 by using the trained AI/ML model.

The output 572 of the model inference module 540 may be transmitted to the denoiser 520. The denoiser 520 may process the output 572 based on the network assistance information such as the rule or LD to determine an output 574. For example, the denoiser 520 may use one or more rules included in the network assistance information to generate the output 574 from the output 572. The output 574 may be referred to as an updated output of the model inference or a denoised or cleaned output of the model inference.

The output 574 of the model inference module 540 may be transmitted to an actor 550. Feedback 552 may be transmitted from the actor 550 to the data collection module 510.

That is, the denoising rule included in the network assistance information can also be used in the inference phase, if the model has not been trained on denoised labels. In this way, the model inference result can be improved.

In some example embodiments, the target of the denoising rule or the LD is to clean the ground truth labels. A similar task can be done during a positioning session on live radio measurements, specifically on UEs that are on regions with low signal to interference plus noise ratio (SINR) (e.g., edge cell) and when UE conditions (capabilities) enable high computational complexity tasks. In such cases, the denoising rule or LD can be fed with the localization method output and it returns the denoised output which is then reported as usual via LPP.

It would be appreciated that some example specifications and embodiments are provided above, and the detailed description may be varied. It is to be understood that these signaling diagrams 200 and 400, the process 300, and the frameworks 500 and 560 for the AI/ML based positioning can be used in any suitable combinations. In this manner, the cleanliness of collected data when the first apparatus 210 is triggered for data collection can be improved. In addition, the positioning accuracy whenever it is triggered for any type of positioning session, AI/ML based or legacy can be improved. The AIML positioning models which have been initially trained by the first apparatus 210, and to which the second apparatus 220 does not have access can be updated. The first apparatus 210 can test itself the effectiveness or performance of the denoiser and then select the right labeling method.

Figure 6:
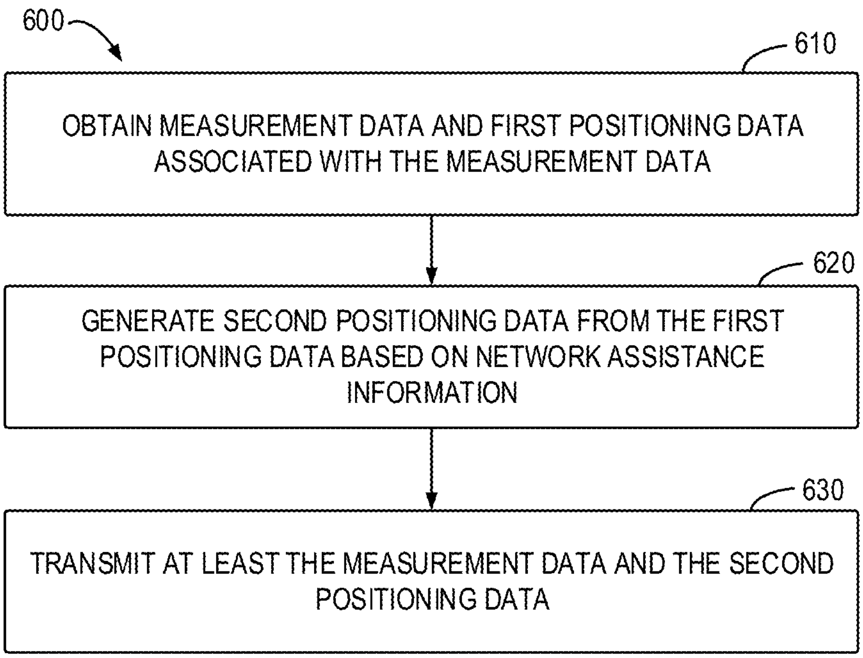
FIG. 6 illustrates a flowchart of a method implemented at a first apparatus according to some example embodiments of the present disclosure.

FIG. 6 shows a flowchart of an example method 600 implemented at a first apparatus in accordance with some example embodiments of the present disclosure. For example, the first apparatus may be implemented as the device 110 or the device 130 in FIG. 1.

At block 610, the first apparatus obtains measurement data and first positioning data associated with the measurement data.

At block 620, the first apparatus generates second positioning data from the first positioning data based on network assistance information.

At block 630, the first apparatus transmits at least the measurement data and the second positioning data.

In some example embodiments, the method 600 further comprises: receiving, from a second apparatus, the network assistance information. The network assistance information may include at least one of: a rule to be applied to generate the second positioning data from the first positioning data, an application condition of the rule, an indication that reception of the measurement data and the second positioning data is prioritized, or a request for a noise level during a time period within an area.

In some example embodiments, the method 600 further comprises: in response to receiving the request for the noise level, transmitting the noise level to the second apparatus.

In some example embodiments, the method 600 further comprises: in accordance with a determination that the noise level is greater than or equal to a threshold level, transmitting the noise level to the second apparatus.

In some example embodiments, the network assistance information further includes the threshold level.

In some example embodiments, the method 600 further comprises: transmitting, to a third apparatus, a request for a rule to be applied to generate the second positioning data from the first positioning data; and in response to transmitting the request for the rule, receiving, from the third apparatus, the network assistance information including the rule.

In some example embodiments, the rule is related to at least one of: a positioning technology, a positioning area, or a type of the first apparatus.

In some example embodiments, the method 600 further comprises: transmitting the measurement data, the first positioning data and the second positioning data to the second apparatus.

Figure 7:
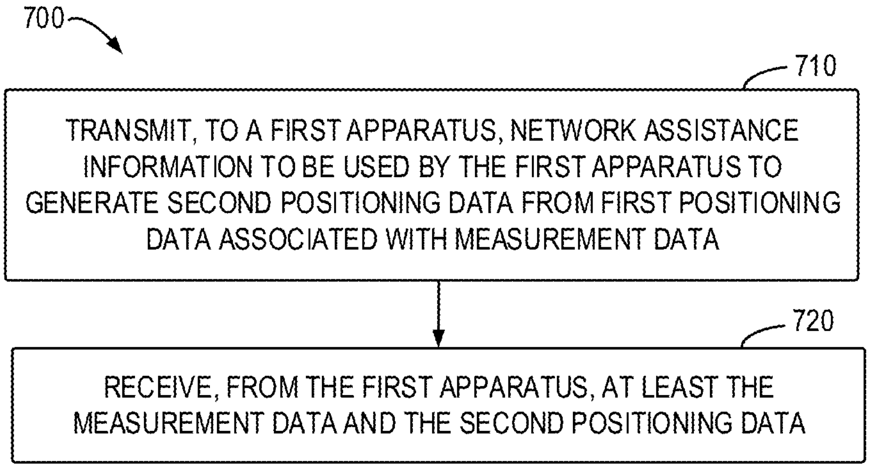
FIG. 7 illustrates a flowchart of a method implemented at a second apparatus according to some example embodiments of the present disclosure.

FIG. 7 shows a flowchart of an example method 700 implemented at a second apparatus in accordance with some example embodiments of the present disclosure. For example, the second apparatus may be implemented as the device 120 in FIG. 1.

At block 710, the second apparatus transmits, to a first apparatus, network assistance information to be used by the first apparatus to generate second positioning data from first positioning data associated with measurement data.

At block 720, the second apparatus receives, from the first apparatus, at least the measurement data and the second positioning data.

In some example embodiments, the network assistance information includes at least one of: a rule to be applied to generate the second positioning data from the first positioning data, an application condition of the rule, an indication that reception of the measurement data and the second positioning data is prioritized, or a request for a noise level during a time period within an area.

In some example embodiments, the method 700 further comprises: in response to transmitting the request for the noise level, receiving the noise level from the first apparatus.

In some example embodiments, the network assistance information further includes a threshold level for the noise level.

In some example embodiments, the rule is related to at least one of: a positioning technology, a positioning area, or a type of the first apparatus.

In some example embodiments, the method 700 further comprises: receiving the measurement data, the first positioning data and the second positioning data from the first apparatus.

In some example embodiments, the method 700 further comprises: transmitting, to the first apparatus, a request to receive a rule to be applied to generate the second positioning data from the first positioning data from a third apparatus; and/or transmitting, to the third apparatus, a request to transmit the rule to the first apparatus.

Figure 8:
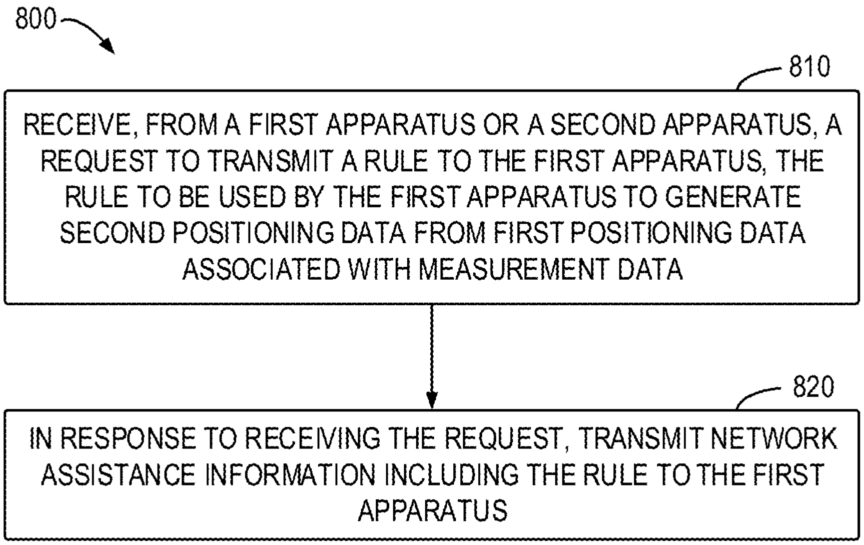
FIG. 8 illustrates a flowchart of a method implemented at a third apparatus according to some example embodiments of the present disclosure.

FIG. 8 shows a flowchart of an example method 800 implemented at a third apparatus in accordance with some example embodiments of the present disclosure. For example, the third apparatus may be implemented as the device 110 or the device 130 in FIG. 1.

At block 810, the third apparatus receives, from a first apparatus or a second apparatus, a request to transmit a rule to the first apparatus. The rule is to be used by the first apparatus to generate second positioning data from first positioning data associated with measurement data.

At block 820, in response to receiving the request, the third apparatus transmits network assistance information including the rule to the first apparatus.

In some example embodiments, the method 800 further comprises: receiving, from the first apparatus, at least the measurement data and the second positioning data.

In some example embodiments, a first apparatus capable of performing any of the method 600 (for example, the device 110 or the device 130 in FIG. 1) may comprise means for performing the respective operations of the method 600. The means may be implemented in any suitable form. For example, the means may be implemented in a circuitry or software module. The first apparatus may be implemented as or included in the device 110 or the device 130 in FIG. 1.

In some example embodiments, the first apparatus comprises means for obtaining measurement data and first positioning data associated with the measurement data; means for generating second positioning data from the first positioning data based on network assistance information; and means for transmitting at least the measurement data and the second positioning data.

In some example embodiments, the first apparatus further comprises: means for receiving, from a second apparatus, the network assistance information. The network assistance information may include at least one of: a rule to be applied to generate the second positioning data from the first positioning data, an application condition of the rule, an indication that reception of the measurement data and the second positioning data is prioritized, or a request for a noise level during a time period within an area.

In some example embodiments, the first apparatus further comprises: means for in response to receiving the request for the noise level, transmitting the noise level to the second apparatus.

In some example embodiments, the first apparatus further comprises: means for in accordance with a determination that the noise level is greater than or equal to a threshold level, transmitting the noise level to the second apparatus.

In some example embodiments, the network assistance information further includes the threshold level.

In some example embodiments, the first apparatus further comprises: means for transmitting, to a third apparatus, a request for a rule to be applied to generate the second positioning data from the first positioning data; and means for in response to transmitting the request for the rule, receiving, from the third apparatus, the network assistance information including the rule.

In some example embodiments, the rule is related to at least one of: a positioning technology, a positioning area, or a type of the first apparatus.

In some example embodiments, the first apparatus further comprises: means for transmitting the measurement data, the first positioning data and the second positioning data to the second apparatus.

In some example embodiments, the first apparatus further comprises means for performing other operations in some example embodiments of the method 600. In some example embodiments, the means comprises at least one processor; and at least one memory storing instructions that, when executed by the at least one processor, cause the performance of the first apparatus.

In some example embodiments, a second apparatus capable of performing any of the method 700 (for example, the device 120 in FIG. 1) may comprise means for performing the respective operations of the method 700. The means may be implemented in any suitable form. For example, the means may be implemented in a circuitry or software module. The second apparatus may be implemented as or included in the device 120 in FIG. 1.

In some example embodiments, the second apparatus comprises means for transmitting, to a first apparatus, network assistance information to be used by the first apparatus to generate second positioning data from first positioning data associated with measurement data; and means for receiving, from the first apparatus, at least the measurement data and the second positioning data.

In some example embodiments, the network assistance information includes at least one of: a rule to be applied to generate the second positioning data from the first positioning data, an application condition of the rule, an indication that reception of the measurement data and the second positioning data is prioritized, or a request for a noise level during a time period within an area.

In some example embodiments, the second apparatus further comprises: means for in response to transmitting the request for the noise level, receiving the noise level from the first apparatus.

In some example embodiments, the network assistance information further includes a threshold level for the noise level.

In some example embodiments, the rule is related to at least one of: a positioning technology, a positioning area, or a type of the first apparatus.

In some example embodiments, the second apparatus further comprises: means for receiving the measurement data, the first positioning data and the second positioning data from the first apparatus.

In some example embodiments, the second apparatus further comprises: means for transmitting, to the first apparatus, a request to receive a rule to be applied to generate the second positioning data from the first positioning data from a third apparatus; and/or means for transmitting, to the third apparatus, a request to transmit the rule to the first apparatus.

In some example embodiments, the second apparatus further comprises means for performing other operations in some example embodiments of the method 700. In some example embodiments, the means comprises at least one processor; and at least one memory storing instructions that, when executed by the at least one processor, cause the performance of the second apparatus.

In some example embodiments, a third apparatus capable of performing any of the method 800 (for example, the device 110 or the device 130 in FIG. 1) may comprise means for performing the respective operations of the method 800. The means may be implemented in any suitable form. For example, the means may be implemented in a circuitry or software module. The third apparatus may be implemented as or included in the device 110 or the device 130 in FIG. 1.

In some example embodiments, the third apparatus comprises means for receiving, from a first apparatus or a second apparatus, a request to transmit a rule to the first apparatus, the rule to be used by the first apparatus to generate second positioning data from first positioning data associated with measurement data; and means for in response to receiving the request, transmitting network assistance information including the rule to the first apparatus.

In some example embodiments, the third apparatus further comprises: means for receiving, from the first apparatus, at least the measurement data and the second positioning data.

In some example embodiments, the third apparatus further comprises means for performing other operations in some example embodiments of the method 800. In some example embodiments, the means comprises at least one processor; and at least one memory storing instructions that, when executed by the at least one processor, cause the performance of the third apparatus.

Figure 9:
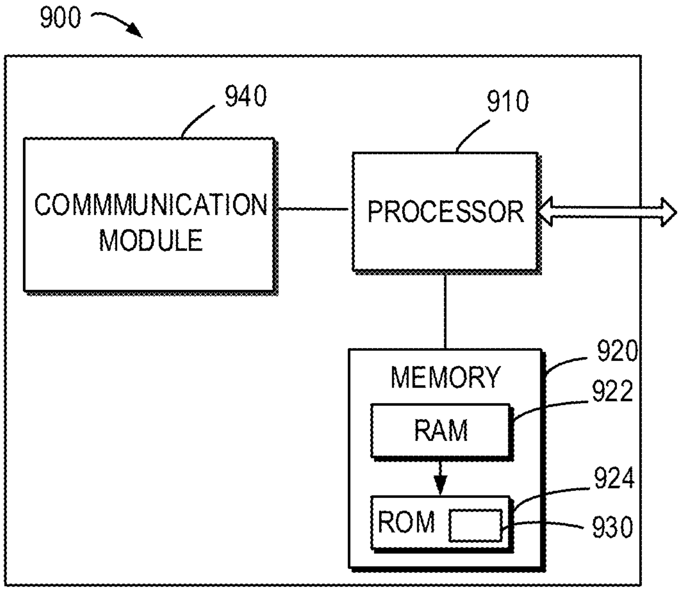
FIG. 9 illustrates a simplified block diagram of a device that is suitable for implementing example embodiments of the present disclosure.

FIG. 9 is a simplified block diagram of a device 900 that is suitable for implementing example embodiments of the present disclosure. The device 900 may be provided to implement a communication device, for example, the device 110, the device 120 or the device 130 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements. In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The instructions of the program 930 may include instructions for performing operations/acts of some example embodiments of the present disclosure. The program 930 may be stored in the memory, e.g., the ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIG. 2 to FIG. 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 10:
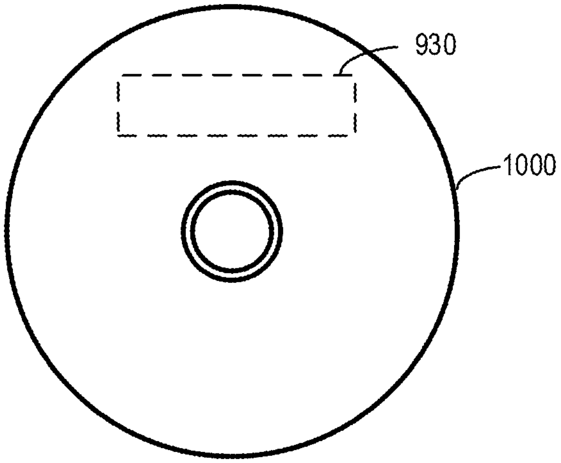
FIG. 10 illustrates a block diagram of an example computer readable medium in accordance with some example embodiments of the present disclosure.

FIG. 10 shows an example of the computer readable medium 1000 which may be in form of CD, DVD or other optical storage disk. The computer readable medium 1000 has the program 930 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:

a processor; and a memory comprising computer-executable instructions that, when executed by processor, cause the first apparatus to perform the following operations:

obtaining measurement data comprising New Radio (NR) positioning reference signal (PRS)-based positioning measurements of field NR signals;

determining first positioning data associated with the measurement data, the first positioning data comprising: a two-dimensional location estimate of the first apparatus, and a respective estimated signal-to-interference-plus-noise ratio (SINR) value for each of a plurality of detected PRSs, wherein the first positioning data represents a noisy positioning label;

receiving, from a second apparatus implementing a location management function (LMF), network assistance information via a Long Term Evolution positioning protocol (LPP) information element, wherein the network assistance information comprises a label denoiser configuration (LD-config) that:

is explicitly identified as applicable to NR positioning technology;

defines a plurality of ordered denoising operations; and specifies which of the two-dimensional location estimate and the estimated SINR values are used as inputs to the denoising operations;

generating second positioning data by applying the plurality of ordered denoising operations defined in the LD-config to the first positioning data to produce a corrected two-dimensional location estimate; and transmitting, to the LMF, the measurement data and the second positioning data together with an identifier of the LD-config used to generate the second positioning data for training or updating a positioning model.

2. The first apparatus of claim 1, wherein the LD-config further comprises an applicability condition indicating a positioning area within a cell for which the plurality of ordered denoising operations are valid.

3. The first apparatus of claim 2, wherein the LD-config further comprises an applicability condition indicating a type of terminal device, including pedestrian or vehicle-to-everything (V2X), for which the plurality of ordered denoising operations are valid.

4. The first apparatus of claim 3, wherein the network assistance information further comprises a request to report a noise level experienced by the first apparatus during a configured time window within a region of interest.

5. The first apparatus of claim 4, wherein the operations further comprise transmitting, to the LMF, the noise level experienced during the configured time window.

6. The first apparatus of claim 5, wherein the LD-config further comprises a threshold noise level, and wherein transmitting the noise level comprises transmitting the noise level only when the experienced noise level is greater than or equal to the threshold noise level.

7. The first apparatus of claim 6, wherein transmitting the measurement data and the second positioning data further comprises transmitting the first positioning data together with the measurement data and the second positioning data.

8. The first apparatus of claim 7, wherein the network assistance information further comprises an indication that reception of the measurement data and the second positioning data is prioritized over reception of the first positioning data.

9. The first apparatus of claim 8, wherein the LD-config comprises parameter settings defining an architecture of a label denoiser, including: a depth parameter, activation function information, weight values, and bias values.

10. The first apparatus of claim 9, wherein the second positioning data is generated prior to use of the measurement data and second positioning data as training data for training the positioning model at the first apparatus.

11. A method performed by a first apparatus, the method comprising:

obtaining measurement data comprising New Radio (NR) positioning reference signal (PRS)-based positioning measurements of field NR signals;

determining first positioning data associated with the measurement data, the first positioning data comprising: a two-dimensional location estimate of the first apparatus, and a respective estimated signal-to-interference-plus-noise ratio (SINR) value for each of a plurality of detected PRSs, wherein the first positioning data represents a noisy positioning label;

receiving, from a second apparatus implementing a location management function (LMF), network assistance information via a Long Term Evolution positioning protocol (LPP) information element, wherein the network assistance information comprises a label denoiser configuration (LD-config) that:

is explicitly identified as applicable to NR positioning technology;

defines a plurality of ordered denoising operations; and specifies which of the two-dimensional location estimate and the estimated SINR values are used as inputs to the denoising operations;

generating second positioning data by applying the plurality of ordered denoising operations defined in the LD-config to the first positioning data to produce a corrected two-dimensional location estimate; and transmitting, to the LMF, the measurement data and the second positioning data together with an identifier of the LD-config used to generate the second positioning data for training or updating a positioning model.

12. The method of claim 11, wherein the LD-config further comprises an applicability condition indicating a positioning area within a cell for which the plurality of ordered denoising operations are valid.

13. The method of claim 12, wherein the LD-config further comprises an applicability condition indicating a type of terminal device, including pedestrian or vehicle-to-everything (V2X), for which the plurality of ordered denoising operations are valid.

14. The method of claim 13, wherein the network assistance information further comprises a request to report a noise level experienced by the first apparatus during a configured time window within a region of interest.

15. The method of claim 14, wherein the operations further comprise transmitting, to the LMF, the noise level experienced during the configured time window.

16. The method of claim 15, wherein the LD-config further comprises a threshold noise level, and wherein transmitting the noise level comprises transmitting the noise level only when the experienced noise level is greater than or equal to the threshold noise level.

17. The method of claim 16, wherein transmitting the measurement data and the second positioning data further comprises transmitting the first positioning data together with the measurement data and the second positioning data.

18. The method of claim 17, wherein the network assistance information further comprises an indication that reception of the measurement data and the second positioning data is prioritized over reception of the first positioning data.

19. The method of claim 18, wherein the LD-config comprises parameter settings defining an architecture of a label denoiser, including: a depth parameter, activation function information, weight values, and bias values.

20. The method of claim 19, wherein the second positioning data is generated prior to use of the measurement data and second positioning data as training data for training the positioning model at the first apparatus.

* * * * *